United States Patent [19]

Sandiford

[11] Patent Number: 4,665,986
[45] Date of Patent: May 19, 1987

[54] GEL AND METHOD FOR REDUCING STEAM CHANNELING

[75] Inventor: Burton B. Sandiford, Balboa Island, Calif.

[73] Assignee: Cities Service Oil and Gas Corporation, Tulsa, Okla.

[21] Appl. No.: 822,118

[22] Filed: Jan. 24, 1986

Related U.S. Application Data

[63] Continuation-in-part of Ser. No. 624,035, Jun. 25, 1984, abandoned.

[51] Int. Cl.[4] ...................... E21B 33/138; E21B 43/24
[52] U.S. Cl. ..................................... 166/288; 166/270; 166/272; 166/295; 166/300; 166/303; 523/130
[58] Field of Search ............... 166/270, 272, 288, 294, 166/295, 300, 303; 523/130

[56] References Cited

U.S. PATENT DOCUMENTS

| | | |
|---|---|---|
| 2,249,538 | 7/1941 | McDowell et al. ................. 524/291 |
| 2,311,059 | 2/1943 | Lowe ................................ 524/291 X |
| 3,878,686 | 4/1975 | Hageman et al. ................. 166/295 X |
| 3,994,345 | 11/1976 | Needham ............................ 166/303 |
| 4,361,186 | 11/1982 | Kalina ................................ 166/295 |

Primary Examiner—George A. Suchfield
Attorney, Agent, or Firm—F. Eugene Logan; William N. Patrick

[57] ABSTRACT

A gel-forming composition is provided comprising a PVA based substance selected from the group consisting of a polyvinyl alcohol, a polyvinyl alcohol copolymer, and mixtures thereof, an aldehyde operable for crosslinking with the PVA based substance, and water. The gel-forming composition is useful for reducing steam channeling in subterranean formations. For example, a method is provided for diverting the flow of injected steam in nonproductive steam channels in an oil reservoir during waterflood and steam cycling operations.

14 Claims, No Drawings

GEL AND METHOD FOR REDUCING STEAM CHANNELING

RELATED APPLICATIONS

This application is a continuation-in-part application of Ser. No. 624,035 filed June 25, 1984, now abandoned, which is incorporated herein by reference. The subject matter of this application is related to that of commonly assigned U.S. Pat. No. 4,498,540 for "Gel for Retarding Water Flow" which is hereby incorporated herein by reference.

TECHNICAL FIELD

This invention relates to gels, methods of forming gels, and process for reducing steam losses in steam channels. A polyvinyl alcohol based-aldehyde hydrogel, or gel, is provided which is useful for plugging nonproductive steam channels. The gels of this invention are particularly valuable because they have improved stability. The gel-forming compositions of this invention can be placed into the steam channels and are less damaging to the oil-bearing part of the reservoir than many other stable plugging agents.

BACKGROUND OF THE INVENTION

Steam injection has significantly increased oil production in many reservoirs but frequently the efficiency of oil recovery is low because of steam channeling. Due to density differences between steam and reservoir fluids, steam rises to the top of the nonproductive steam reservoir overriding the oil body and penetrates the formation thereby creating a nonproductive steam channel. For example, in steam drive floods the rejected steam prematurely breaks through the formation and into the producing wells in such a manner that the more productive oil-bearing parts of the reservoir are short circuited. Steam therefore tends to open up channels which did not exist before and many of these channels are nonproductive. These nonproductive channels are difficult to plug, particularly for long periods of time. Most of the commonly used polymer based plugging agents used to plug off water will degrade at steam temperatures and lose their plugging capability within a few days. The more temperature stable plugging agents usually are too viscous to be effective in plugging the usually smaller and more difficult to reach nonproductive steam channels. For these reasons, long-term and indepth plugging of nonproductive steam channels is considered to be very difficult if not impossible to achieve. Consequently, a long-term plugging agent stable at steam temperatures would be of great benefit to the oil producing industry.

Presently foaming agents are used to divert steam but because of their instability at steam temperatures they tend to break down within a few days and are no longer effective for preventing steam loss. As a result, foam-forming agents usually must be injected once or twice a week in order to plug the steam channels and divert the steam into the more productive part of the reservoir. Examples of foam-forming agents and surfactants used to divert steam are sulfonates of alpha-olefins, or blends thereof such as sodium alkene sulfonate and hydroxy sulfonate, or sodium and amino oxyethylene sulfates either with or without admixing with carboxymethyl cellulose, or aliphatic sulfonates such as sodium dodecylbenzene sulfonate. Carboxymethyl cellulose or "CMC" is thought to encapsulate the steam foam and prevents the foaming agent from being activated until the CMC thermally degrades. This method was designed to permit the foam to penetrate deeper into the formation. Unfortunately the method does not appear to be particularly successful and apparently produces no better results than the use of the foam agent without CMC. Furthermore, the blending of the foaming agent with CMC ostensibly is very costly since copious quantities of materials appear to be necessary. Unfortunately most of the foaming agents break down at steam temperature and are usually only effective for up to about 4 days thereby requiring frequent reinjection of foaming agents which is both time consuming and costly.

Lignosulfonates have been proposed as a plugging agent in U.S. Pat. No. 4,074,757 but their use, it is believed, has had very limited success and relatively very large amounts are believed to be required. Although they form a permanent gel at high temperatures, in order to prevent serious damage to oil-bearing zones it is believed that it would be necessary to isolate the treatment to the nonproductive steam channels. Such isolation obviously is very difficult to achieve. These problems are perhaps part of the reason why lignosulfonates do not seem to be widely used.

Thus there is a need in the oil producing industry for a plugging agent which is stable at steam temperature, which is mobile enough to be carried deeply into the nonproductive steam channels, and which is sufficiently compatible with the oil-bearing part of the reservoir that it will not seriously damage it.

A method of reducing the flow of fluid, specifically water, has been described in U.S. Pat. No. 3,762,476 wherein a first aqueous polymer solution selected from the group consisting of polyacrylamide, a partially hydrolyzed polyacrylamide, a polysaccharide, a carboxymethylcellulose, a polyvinyl alcohol, and polystyrene sulfonate, is injected into a subterranean formation. Thereafter, a complexing ionic solution of multivalent cations and retarding anions, and which also comprises aluminum citrate, is injected into the subterranean formation. The multivalent cations are selected from the group consisting of Fe(II), Fe(III), Al(III), Ti(IV), Zn(II), Sn(IV), Ca(II), Mg(II), Cr(III), and the retarding anions are selected from the group consisting of acetate, nitrilotriacetate, tartrate, citrate, phosphate. Brine is then injected followed by a second slug of an aqueous polymer solution which can be the same or different from the first aqueous polymer solution. In any event, the complexing ionic solution of multivalent cations and retarding anions is capable of gelling both the first and second aqueous polymer solution.

U.S. Pat. No. 4,098,337 discloses a method for forming a hydroxymethylated polyacrylamide gel, in situ, to reduce the permeability of a thusly treated zone where the waterflood method of oil recovery is employed. In this case the gel was formed in situ by the injection of an aqueous polyacrylamide solution and an aqueous formaldehyde solution.

Although polyacrylamide-based gels can be effective in retarding water production or flow in some subterranean formations, polyacrylamide-based gels will not be stable or effective in all formations. In general, polyacrylamide-based gels will work satisfactorily in formations having a temperature below about 65° C. Above about 65° C., polyacrylamide-based gels become very sensitive to hardness of the brines, especially where hardness is above about 1000 ppm. The hardness of the water becomes a more detrimental factor the higher the temperature, thus for very hot regions even low hardness levels can render many gels ineffective. Formations which have a higher temperature, hardness, or total dissolved solids content above the aforementioned ranges usually are not capable of being successfully treated with polyacrylamide-based polymers to retard the flow of water. Thus polyacrylamide-based gels are not considered useful in preventing steam channeling.

In other flooding operations, rather than water, other fluids can be used. Some fluids which are used are carbon dioxide and steam. Because of the high temperature required in steam flooding or other steam stimulation methods, most of the gels used for blocking water are not suitable or satisfactory for blocking steam. Other steam treating methods such as "Push and Pull" operations, sometimes referred to as "cyclic steam injection" or "Huff and Puff" operations, where a production well is steamed for several days and then produced for a month or so result in steam channels being formed which if not blocked will result in an inefficient steaming operation due to loss of steam into channels which drain into nonproductive parts of the reservoir. Because many of the existing gels degrade rapidly at steam temperatures, polymers such as polyacrylamides are generally considered unsatisfactory.

Flooding operations using steam and other gases as the drive fluid frequently experience a loss of drive fluid to nonproductive parts of the reservoir because of greater ability of gases to dissipate into such channel as opposed to liquids. Loss of drive gases in flooding operations and steam in stimulation methods is more difficult to prevent because the flow channels responsible for such losses can be very small in diameter or width thereby making it very difficult to fill such channels with a blocking agent. Some viscous plugging substances, even though they may have the desired stability at higher temperatures, are not able to penetrate and effectively fill narrow channels, particularly as such channels become more distant from the wellbore.

Polyvinyl alcohol gels have been used to protect well casings from corrosion. U.S. Pat. No. 2,832,414 discloses such a method wherein an aqueous solution of a water soluble polyvinyl alcohol which is capable of forming a gel if maintained in a quiescent state, is pumped into the annular space between the casing and the wall of the bore hole. After allowing the polymer to remain quiescent over a period of time a gel is formed. The thusly formed gel prevents the intrusion of formation water into the annular space thereby reducing corrosion of the metal casing. Apparently, no crosslinking agent is employed and for that reason is not believed that this particular gel would be useful for plugging steam channels. Furthermore, in Patent No. 2,832,414 the gel is used to fill a relatively large but stagnant cavity compared to the substantial flows occurring in steam channels.

Studies of the macroscopic changes in polyvinyl acetate gels that occur upon removal from swelling equilibrium with isopropyl alcohol were reported in the Journal of Colloid and Interface Science, Vol. 90, No. 1, November 1982, pages 34 to 43. These studies were conducted using films of gels having various degrees of crosslinking and polymer concentration. The polyvinyl acetate gels were formed from precursor polyvinyl alcohol gels that were crosslinked with glutaric dialdehyde which were then converted to acetate gels by polymer homologous acetylation.

U.S. Pat. No. 3,265,657 discloses a process for preparing an aqueous polyvinyl alcohol composition, which remains fluid for at least a few seconds after preparation and spontaneously gels thereafter. The gel is formed by contacting a gelable fluid aqueous polyvinyl alcohol solution with a hexavalent chromium compound and a reductive agent to convert Cr(VI) to Cr(III). The compositions are used to produce foams suitable as insulating, acoustical, and packaging materials. The gels are crosslinked with chromium, not an aldehyde.

U.S. Pat. No. 3,658,745 discloses a hydrogel which is capable of significant expansion upon cooling in water and reversible shrinking upon heating which comprises a crosslinked acetalated hydrogel formed by reacting a polyvinyl alcohol previously dissolved in water and a monaldehyde and a dialdehyde. The hydrogels are alleged to have sufficient crosslinking to prevent imbibition of macromolecular materials such as proteins but not the imbibition of micromolecular materials such as low molecular weight water solutes. These hydrogels are alleged to be useful for dialytic purification when pure water is added to the macromolecular solution after each cycle. Apparently these particular hydrogels are able to absorb and desorb water and microsolutes with alternate cooling and heating cycles. Apparently a major amount of shrinkage of these gels occurs upon slight heating such as from 12° to 37° C. which indicates that these gels would have little value for preventing steam channeling in subterranean formations, especially at temperatures of 37° C. or higher.

SUMMARY OF THE INVENTION

By the term "aldehyde" as used herein is meant a monoaldehyde, a dialdehyde, a polyaldehyde, and any of the former whether substituted or unsubstituted. Preferably the aldehyde contains two functional groups such as dialdehyde or a substituted monoaldehyde as used herein is meant to include unsaturated carbon-carbon bond as well as substitution of functional groups. Nonlimiting examples of substituted monoaldehyde are acrolein and acrolein dimethylacetal. Polyaldehydes can be used and may in some cases be more desirable, however, polyaldehydes are not as available commercially as dialdehydes and as a consequence use of polyaldehydes may not be practical.

Non-limiting examples of dialdehyde crosslinking agents are glyoxal, malonaldehyde, succinaldehyde, glutaraldehyde, adipaldehyde, terephthaldehyde. Non-limiting examples of dialdehyde derivatives are glyoxal bisulfite addition compound

glyoxal trimeric dihydrate, malonaldehyde bisdimethylacetal, 2,5-dimethoxytetrahydrofuran, 3,4-dihydro-2-methoxy-2H-pyran, and furfural. Acetals, hemiacetals, cyclic acetals, bisulfite addition compounds, shiff's bases or other compounds which generate dialdehydes in water, either alone or in response to an additional agent such as an acid or a condition such as heat are also meant to be included in the term "aldehyde" as used and claimed herein.

Non-limiting examples of monoaldehyde with a second functional group in addition to the aldehyde group are acrolein and acrolein dimethylacetal.

Non-limiting examples of polyaldehydes are polyacrolein dimethylacetal, addition products of acrolein for example, ethylene glycol plus acrolein, and glycerol plus acrolein.

By the term "acidic catalyst" or "crosslinking catalyzing substance" as used herein is meant a substance which is a proton donor or a substance which in its environment will form or become a proton donor. All acids are operable as an acidic catalyst in the gel systems described herein, for example, Bronsted acids such as mineral and carboxylic acids, or Lewis acids. Non-limiting examples of a Lewis acid are zinc chloride, ferrous chloride, stannous chloride, aluminum chloride, barium fluoride, and sulfur trioxide. Some of these chemicals hydrolyse in water to produce metal oxides or hydroxides and HCl or HF. The rate of hydrolysis of many Lewis acids is dependent on temperature and the other dissolved compounds in the solution. The rate of production of the acidic catalyst, HCl, from some of the above Lewis acids determines the rate of gel formation.

A delayed action catalyst is a substance which is not acidic in and of itself, but which generates an acidic catalyst slowly on interaction with water at the temperature of interest. For example, the rate of generation of the acid in oil well usage is usually controlled by the reservoir temperature experienced during the in-situ gel formation. In many applications the rate of acidic catalyst generation or release can be controlled by the gel-forming fluid formulation to range from a few minutes to a few days or more.

The acid catalyst can be a two component system, for example, a two component delayed action catalyst can comprise a first component which will react with a second component, to form an acidic catalyst. A non-limiting example of such a two component delayed action catalyst is sodium persulfate and a reducing agent. In such a delayed catalyst system the sodium persulfate reacts with the reducing agent to produce sulfuric acid. In another two component delayed action catalyst system the reaction product of the two components can react with water to form the acidic catalyst.

The acidic catalyst and/or delayed action catalyst must, of course, have some solubility in water. However, in some oil field usages the partial solubility of the acidic catalyst in the oil product can be advantageous if treatment is to include subterranean zones containing both oil and water. The fraction of the acidic catalyst or delayed action catalyst which dissolutes in oil will, of course, not be available to catalyze the gel formation reaction in such zones of high oil content; consequently such oil-water zones will not be blocked by gel formation to the same extent as those zones with little or no oil present.

Non-limiting examples of delayed action catalysts are methyl formate, ethyl formate, methyl acetate, ethyl acetate, glycerol monoacetate or acetin and glycerol diacetate or diacetin.

Laboratory tests conducted on core samples have shown that diacetin hydrolysis more slowly than methyl formate at all temperatures including the higher temperatures. Therefore, where subterranean formations having higher temperatures are encountered, diacetin or acetin because of their slower rate of hydrolysis are used to provide a longer time for crosslinking reactions to occur and hence provide a longer time for the gelling forming fluids to penetrate into the pores of such subterranean zones before gelation occurs. Non-limiting examples of delayed action catalyst and their acidic catalyst product are:

| Delayed Action Catalyst | Acidic Catalyst Product |
|---|---|
| Methyl formate | Formic acid |
| Glycerol diacetate | Acetic acid |
| Sodium persulfate | Sulfuric acid |
| Sodium dodecyl sulfate | Sulfuric acid |
| Methyl methane sulfonate | Methylsulfonic acid |
| Sodium triiodide/sodium bisulfate/water | Hydroiodic acid |

Therefore, delayed action acidic catalysts can be esters which slowly hydrolyze in water, the rate of hydrolysis being dependent on temperature and initial pH. Other delayed action catalysts are the analogs of esters and acids such as sulfones, xanthates, xanthic acids, thiocyanates, and the like. In some of these examples, hydrolysis produces an acidic catalyst which speeds the crosslinking reaction and an alcohol which does not affect gel formation. An example of a delayed action acidic catalyst is methyl formate which is influenced by the environment with respect to the rate of formation of acid. For example, the higher the temperature, the faster methyl formate will hydrolyze and generate formic acid.

By the term "Bronsted acid" as used herein is meant a chemical which can act as a source of protons. By the term "Lewis acid" as used herein is meant a chemical that can accept an electron pair from a base. By the term "delayed action acid" as used herein is meant any acidic catalyst which makes available or generates donor proton over a period of time or after an initial period of time either as a consequence of its characteristic or the characteristics of the environment in which it is used.

By the term "gel" as used herein is meant a chemically crosslinked three-dimensional elastic network of long-chain molecules with a certain amount of immobilized solvent (diluent) molecules.

By the term "PVA based substance" or "PVA" (frequently referred to herein as the "first substance") as used herein is meant long-chain molecules selected from the group consisting of polyvinyl alcohols, polyvinyl alcohol copolymers, and mixtures thereof.

By the term "PVA-aldehyde gel" as used herein is meant a chemically crosslinked three-dimensional elastic network of longchain molecules selected from the group consisting of a polyvinyl alcohol, a polyvinyl alcohol copolymer, and mixtures thereof, crosslinked with an aldehyde, and containing a certain amount of immobilized and chemically bound water molecules.

By the term "PVA-glutaraldehyde gels" as used herein is meant a chemically three-dimensional elastic network of PVA based substance crosslinked with glutaraldehyde, and containing a certain amount of unmobilized and chemically bound water molecules.

By the term "water" as used herein, unless otherwise specified, is meant to include any source of water, including brine, sea water, brackish water, formation water, fresh water and pure water which is $H_2O$. Furthermore if the water is a brine, the brine can be saturated at an elevated temperature. By the term "aqueous" as used herein, unless otherwise specified, is meant to include aqueous solutions comprising such water. Thus, for example, an aqueous solution of the first substance is to be understood to include the first substance dissolved in brine or fresh water.

All of the above mentioned acidic catalysts are effective crosslinking catalyzing substances for PVA-aldehyde and PVA-glutaraldehyde gel systems.

Non-limiting examples of polyvinyl alcohol copolymers are polyvinyl alcohol-co-crotonic acid, polyvinyl alcohol-co-acrylic acid, polyvinyl alcohol-co-methacrylic acid, polyvinyl alcohol-co-vinylpyridine, and polyvinyl alcohol-co-vinylacetate, the latter of which is frequently present in small amounts in commercial grade polyvinyl alcohols.

This invention is concerned with placing a gel-forming composition in the nonproductive steam channels of an oil reservoir which is effective for retarding the flow of steam in such channels. In particular, the gel-forming composition comprises PVA based substance, an aldehyde or aldehyde generating substance operable for crosslinking with the PVA based substance under acidic conditions, and water. The water can be supplied by a brine, and the water or brine can be acidic. It is convenient to dissolve the PVA based substance in formation brine and form an aqueous premixture which is acidic. Then just before injection into the subterranean formation, the aldehyde is added to the premixture thereby producing the gel-forming mixture. In an alternative embodiment the fresh softened water used to produce the injected steam can be used to formulate the gel-forming composition. The PVA-aldehyde-water gels used by this process have much superior stability at steam temperature than most foams, are easier to place in steam channels than most viscous substances such as tars which are stable at steam temperature, and are less damaging to the oil-bearing part of the reservoir than lignosulfonates.

Accordingly, in accordance with the principles of this invention, in a hydrocarbon recovery operation conducted in a subterranean formation in which a loss of steam channels has occurred, there is provided a process for reducing steam loss to nonproductive steam channels comprising introducing an effective amount of a gel-forming composition into the subterranean formation and into the nonproductive steam channels, the gel-forming composition being operable when gelled in the nonproductive steam channels for retarding the flow of steam therein, the gel-forming composition comprising i. an aqueous solution comprising an effective amount of a first substance selected from the group consisting of polyvinyl alcohols, polyvinyl alcohol copolymers, and mixtures thereof, and ii. an effective amount of a second substance selected from the group consisting of aldehydes, aldehyde generating substances, acetals, acetal generating substances, and mixtures thereof capable of crosslinking with the first substance through the formation of acetal crosslinkages, which is operable for effecting, under acidic conditions, crosslinking of the first substance and the second substance or aldehyde and for forming a gel in the nonproductive steam channels; and allowing the gel-forming composition, under acidic conditions, to form a gel in the nonproductive steam channels which is effective for retarding the flow of steam in the nonproductive steam channels, thereby reducing steam loss to nonproductive steam channels upon resumption of a hydrocarbon recovery operation.

In one embodiment the gel-forming composition is introduced into the subterranean formation simultaneously with steam. In yet another embodiment the introduction of steam into the subterranean formation is discontinued during the introduction of the gel-forming composition therein.

In further embodiments of the above described processes comprise the step of introducing a foam-forming composition into the subterranean formation, and forming a foam in the nonproductive steam channels, prior to introducing the gel-forming composition into the subterranean formation. A still further embodiment comprises mixing the gel-forming composition with a part of the foam in the nonproductive steam channels and forming a gel from the gel-forming composition in the interstices of that part of the foam in the nonproductive steam channels. In this embodiment the foam forming agent or composition is admixed with the gel-forming composition and thusly formed admixture is injected into the steam channels simultaneously with steam. The steam causes the foaming agent to generate the foam which as it penetrates into the steam channels forms the cells of the foam. Since the gel-forming composition is admixed with the foaming agent the cells of the form are reenforced by the gel after the gel has formed. Thus the gel is formed in the interstices of the thusly formed foam after the foam is in the steam channels. The foam is more stable by the fact that the foam cells are supported from within and without by the gel. Whereas foams formed by the agent and steam alone tend to collapse when the steam condenses. Furthermore the cellular structure imposed on the gel as a consequence of the foaming agent being admixed with the gel improves the stability of the gel by inhibiting infusion of the material into the gel or migration of material out of the gel as by syneresis. In this embodiment the steam eventually becomes part of the water of the gel-forming composition or gel. By being able to force the admixture of foaming agent and gel-forming composition with steam deep into the steam channels very stable plugging of the steam channels can be achieved without the need for frequent subsequent treatment with additional foam-forming agent. In one embodiment the foam is not formed until after its injection into the subterranean formation in admixture with the gel-forming composition. In any event if some collapse of the foam does occur due to condensation of the steam injected with the foam-forming composition and the gel-forming composition, the collapse will not be complete and foam cells still remain which contain the gel-forming composition. Further if any condensation of the media, i.e. steam, used to form the foam does occur, the condensate since it is water merely becomes part of the gel-forming composition and not a separate gas phase as a noncondensable gas would be. Thus this invention uses a media for expanding the foaming agent, i.e. steam, which if it condenses becomes part of the gel-forming composition. In these various embodiments it is to be understood that gelation of the gel-forming composition in the admixture occurs later in time than the creation of the foam. Thus in one embodiment the foam expanding gas is such that upon its condensation it becomes part of the gel-forming composition and thense part of the gel. Foams containing gels in their cell structure are superior foams than foams supported by just a gas phase, and gels which are reenforced by foams are superior to the gels which are not so reenforced. Thus in this invention the gel has a synergistic effect on the foam and the foam has a synergistic effect on the gel and thus there is provided a more stable composition for plugging steam channels.

In another embodiment, wherein the nonproductive steam channels are at a substantially higher temperature than the temperature of the oil-bearing part of the subterranean formation, the gel-forming composition is capable of gelling within a predetermined amount of time if maintained at or near the temperature of the steam channels, but is not capable of completely gelling within a predetermined period of time when maintained at the temperature of the oil-bearing part of the subterranean formation. This embodiment is particularly useful where the temperature of the nonproductive steam channels is about 22° C. or more higher than the temperature of the oil-bearing part of the subterranean formation. The greater the differences in temperature between the steam channels and the oil-bearing part of the reservoir the greater the advantage of this embodiment.

In accordance with the principles of this invention there is also provided a gel formed from a gel-forming composition comprising i. an aqueous solution of an effective amount of a first substance selected from the group consisting of polyvinyl alcohols, polyvinyl alcohol copolymers, and mixtures thereof, ii. an effective amount of a second substance selected from the group consisting of aldehydes, aldehyde generating substances, acetals, acetal generating substances, and mixtures thereof capable of crosslinking with the first substance through the formation of acetal crosslinkages, said second substance being operable for crosslinking with the first substance under a predetermined acidic condition when the gel-forming composition is maintained for a predetermined period of time at an elevated temperature, the gel-forming composition not being capable of completely gelling within said period of time when maintained at a cooler temperature which is substantially lower than the predetermined elevated temperature, and a foaming agent operable for being foamed, in admixture with said gel-forming composition, with steam, the gel-forming composition being formed by heating or maintaining the gel-forming composition and foaming agent admixture under the predetermined acidic condition for the predetermined amount of time at the predetermined elevated temperature. In a further embodiment the predetermined elevated temperature is at least about 125° C., and the cooler temperature is about 22° C. lower or more than the predetermined elevated temperature. In another embodiment the second substance or aldehyde is glutaraldehyde. In one embodiment the predetermined period of time is no greater than about 5 days. In another embodiment the predetermined period of time is from about 1 hour to about 4 days. In a preferred embodiment the predetermined period of time is from about 2 hours to about 3 days, and in an especially preferred embodiment from about 3 or 4 hours to about 1 or 2 days. By way of example, if the predetermined period of time for gelation at the elevated temperature is 20 hours, then the gel-forming composition is formulated so that it will form a substantially complete gel when maintained at the predetermined temperature for 20 hours; whereas, if the gel is maintained at a substantially lower temperature than the predetermined elevated temperature then a substantially complete gel is not formed in 20 hours. The difference in temperature between the steam channels and the oil-bearing strata permit the gel-forming composition to be removed or flushed from lower temperature zones after the gel-forming composition has gelled in the higher temperature zones.

In wells which have a serious nonproductive steam channeling problem, injecting a foam-forming composition prior to injecting the gel-forming composition can improve the effectiveness of the steam channel plugging operation. Non-limiting examples of foam forming compositions or surfactants are sulfonates of alpha-olefins, hydroxy sulfonates, aliphatic sulfonates and mixtures thereof. The foaming composition by itself or in admixture with the gel-forming composition can be carried into the steam channels with steam. This can also be followed by injecting the gel-forming composition into the steam channels. In one embodiment the gel-forming composition is carried into the nonproductive steam channels with steam. It is to be understood however that injection of the foam-forming composition by itself is only temporary and the principal improvement resides in the injection of the gel-forming composition by itself or in admixture with the foaming agent and steam. The gel-forming composition can penetrate the foam and set up and back up the foam. In one embodiment the foam is used to incorporate the acid and second substance or aldehyde and the injected PVA based substance must penetrate into the foam-acid-aldehyde mixture before it can begin to gel. In another embodiment, either the acid catalyst or the second substance or aldehyde is injected along with the foam and this is followed by injection of the remaining parts of the gel-forming composition which until the first substance comes into contact with the foam containing the second substance and acidic catalyst will not gel. In one embodiment, the acid-aldehyde combination injected with the foam is glutaric acid and glutaraldehyde.

In still another gel or process embodiments, the amount of second substance or aldehyde is from about 0.01 to about 4 percent of the weight of the gel-forming composition or gel. In still another embodiments, the amount of the second substance or aldehyde is at least about 0.7% of the stoichiometric amount required to react with all of the crosslinkable sites of the first substance. In another embodiments the second substance or aldehyde is glutaraldehyde. In one embodiment the amount of PVA based substance is from about 0.5 to about 5% of the weight of a gel-forming composition or gel. In a preferred embodiment the first substance is from about 1 to about 4% of the weight of the gel-forming composition or gel. Preferably the first substance is from about 1.5 to about 3% of the weight of the gel-forming composition or gel. In another embodiment the first substance has an average molecular weight of at least about 30,000. Preferably the average molecular weight of the first substance or polyvinyl alcohol is from about 100,000 to about 1,000,000. Higher molecular weights can be used; however, the higher molecular weight the higher the viscosity of an aqueous solution of the first substance or polyvinyl alcohol. Average molecular weights for the first substance over 5,000,000 will probably form too viscous a solution to be useful. In one embodiment the average molecular weight of the first substance is about 125,000. In a preferred embodiment the PVA based substance or first substance is polyvinyl alcohol. In still another embodiment the gel-forming composition is at least about 64 weight percent water, i.e. $H_2O$. In yet another embodiment the water is provided by a brine and the brine is at least about 91% of the weight of the gel-forming composition. The brine can be saturated with dissolved salt and be hot or near its boiling point. Some hot saturated brines near their boiling points can contain as much as about 30% by weight dissolved salt or as little as about 70% by weight $H_2O$. Exact amounts of dissolved salt will vary depending on the various species of salts involved and the extent of any supersaturation. For example a gel-forming composition which is 91% by weight brine, wherein the brine is saturated and has a $H_2O$ content of 70% by weight, will be about 64% by weight $H_2O$. In one embodiment, the first substance is polyvinyl alcohol. In another embodiment the first substance or polyvinyl alcohol is from about 2.5 to about 3 percent of the weight of the gel-forming composition or gel, and the amount of the second substance or aldehyde, preferably glutaraldehyde, is from about 0.01 to about 1 percent of the weight of the gel-forming composition or gel, and the remainder of the gel-forming composition is a brine having pH less than 7. In another embodiment the pH of the gel-forming composition is from about 2 to about 6.9, and preferably from about 3 to about 6. In yet other embodiments the gel-forming composition also comprises a separately added acidic catalyst.

In one embodiment the total aldehyde content, i.e. mono-, di- and polyaldehyde, of the gel-forming composition is from about 0.01 to about 4% of the weight of the gel-forming composition or thusly formed gel.

This process is useful not only for steamfloods but for stimulation processes such as "push and pull" operations in which steam is injected for about 9 days more or less followed by pumping of oil for about 6 months more or less. Accordingly, in one embodiment the hydrocarbon recovery operation is a steam push and pull operation. In another embodiment the hydrocarbon recovery operation is a steamflooding operation. These processes are particularly useful where the subterranean formation has an average formation temperature of at least about 125° C.

In still further embodiments, the water used to form the gel has a hardness of at least about 1000 ppm. In further embodiments the water has a hardness of at least about 3000 ppm, or 6000 ppm, or higher. In other further embodiments of the above described gels, the water used to form the gel has a total dissolved solids content of at least about 30,000 ppm. In a still further embodiment such water has a total dissolved solids content of at least about 80,000 ppm or more and can be a saturated brine.

In the embodiments of this invention the aldehydes crosslink with the polyvinyl alcohol or polyvinyl alcohol copolymer through formation of acetals. It has been found that gels formed in this way are adaptable to the hardness of the water from which they are formed or exposed. These gels are also more stable at high temperatures than polyacrylamide based gels or gels made from biopolymers or polyvinyl alcohols gelled by other crosslinking agents such as borate.

Because of the adaptability and compatibility of these gels to water hardness or total dissolved solids content, these gels can be prepared using formation water, brackish water, sea water, brine or usually any other available source of water conveniently at hand as well as fresh water, i.e. $H_2O$. Because the largest ingredient used to formulate the above described gels is principally water, substantial economic advantage is provided by this invention which permits gels to be formed with the cheapest source of available water. However, the advantages of this invention are not limited merely to economic advantages because these gels also provide substantial technical advantages over other gels. For example, in many of their uses these gels are subjected to the infusion of severely contaminated water into the gelling mass prior to reaching its gelation point. Where such contaminated water infusion occurs in many other gelling fluids the gelation thereof is destroyed or so severely harmed that such other gels, if in fact they do gel, would be rendered ineffective for their intended use.

Due to their stability at elevated temperatures, the above described gels can also be formed and used in formations having an average formation or in-situ temperature of about 125° C. or higher, and in some embodiments where the average formation or in-situ temperature is 200° C. or higher.

The above described methods of forming a gel in situ in subterranean formations be be practices using all of the gels provided by this invention.

The gels of this invention have improved resistance to heat and are stable in hard water. These characteristics make these gels particularly useful for reducing steam channeling.

DESCRIPTION OF THE PREFERRED EMBODIMENT

It is preferable to conduct flow tests on core samples of crushed rock from the reservoir to be sure that the gel times are not materially different from that of neutral rock. The first example demonstrates a method for determining gel times.

Example No. 1

Since normally fresh soft water is used to produce injected steam, this same water is preferably used to produce the gel-forming composition. Polyvinyl alcohol having an average molecular weight of about 125,000 is added to softened fresh water to produce a 10 percent concentration and the mixture is heated to 95° C. for 45 minutes to completely dissolve the polymer. A high pressure core holder is packed with crushed reservoir rock to form a 60 centimeter (60 cm) long, 5 cm diameter test core sample. The core sample is then saturated with softened water and heated to 230° C. in preparation for a flow test. Steam, at 230° C. is injected into the core sample at a rate, based on a water equivalence, of 300 cm per day and the pressure drop across the core sample measured. The gel-forming composition is prepared by mixing 24 parts of the thusly prepared 10 percent polymer solution with one part by weight of a 50 percent glutaraldehyde solution (commercial grade). The gel-forming composition is injected at a rate of 60 cm per day simultaneously with 230° C. steam or steam and a forming agent at a rate, based on a water equivalence, of 180 cm per day into the core sample. The gel-forming composition is nominally designed for a gel time of 3 hours at 230° C. The variation of gel-time from nominal is an indication of the influence of the reservoir rock on reaction rates.

Example No. 2

Preferably after determining the optimum gel-forming composition in crushed reservoir rock for a given steam channel temperature and a desired gel time, treatment of an injection well experiencing severe steam channeling can be conducted with the PVA-aldehyde gel systems of this invention. For example, an injection well having a 15 meter reservoir interval with the top 1.5 meters taking about 90 percent of the injected steam and the top 3 meters taking about 100 percent of the injected steam, and having an average interval permeability of about 500 millidarcies (500 md) and porosity of about 25 percent, is receiving about 130 cubic meters per day (130 CMPD), based on a water equivalence, of 230° C. injected steam at a surface pressure of about 50 kilograms per square centimeter gauge (50 kpscg).

An aqueous gel-forming composition, formulated as in Example No. 1, is heated to 95° C. in an in-line heater and stored in an insulated tank for about 2 hours. The gel-forming composition is then fed at a rate of 30 CMPD to an eductor which is simultaneously receiving 100 CMPD of steam or steam and a foaming agent, based on water equivalence. The gel-forming composition is conveyed into the reservoir by the injected steam for a 12 hour period, and thereafter displaced into the formation with steam at 100 CMPD, based on water equivalence, until fully displaced from the wellbore into the reservoir. The well is then shut in for about 24 hours and thereafter steam injection then resumed. It is expected that the top 300 cm of the interval will receive less than 50 percent of the injected steam after treatment.

Example No. 3

A producing well, 60 meters from a steam injection well in a steam-flood operation, is producing steam and hot water equivalent to 80 CMPD of water and 10 CMPD of oil. A production survey shows that the top 3 meters of a 15 meter interval is experiencing steam breakthrough. The temperature of the steam at the production point in the producing well is 125° C. whereas the original reservoir temperature was 50° C. The steam injection raises the average fluid temperature near the wellbore to 90° C. A decision is made to treat the production well by the method of this invention. Accordingly, 160 cubic meters of gel-forming composition having a concentration of 2.5% polyvinyl alcohol having an average molecular weight of about 125,000 and 0.1% glutaraldehyde, and having a pH of 5.5 is prepared for injection into the production well.

Prior to injection of the gel-forming composition, the producing well is shut down and 60 cubic meters of cold produced water is injected into the production well at a rate equal to 160 CMPD. Most of the cold water enters the steam channels in the top 3 meters of the interval but about 25% of the cold water enters the bottom 12 meters thereof. After the cold water cools down the bottom 12 meters of the interval, steam is then injected into the producing well and because of the higher permeability of the steam channels, the steam channels reach a higher temperature than the less permeable oil bearing part of the formation. The interval is now ready for injection of the gel-forming composition or admixture of gel-forming composition and foam-forming composition.

The gel-forming composition is designed to gel in about 30 hours at 120° C. but to not gel within seven days at a temperature no greater than 80° C. The gel-forming composition with or without a foaming agent is injected over a 24-hour period, and then the well shut in for 24 hours. During this period only gel-forming composition in the higher temperature steam channels gels. The well is put back on production and the ungelled composition in the lower 12 meters of the interval is produced or purged from the production well. It is expected that after treatment water production is reduced to 20 CMPD and oil production is increased to 20 CMPD.

Example No. 4

A producing well is on its third cycle of steam injection and the results of the second cycle shows a drop in efficiency of oil production as compared to the first cycle. Other wells in the field show similar results. Evaluation of the formation based on geologic and core data indicates a high permeability channel near the bottom of the production interval. A decision is made to plug the high permeability channel with the method of this invention. Core sample data shows that a gel-forming composition having a concentration of 2.5% of polyvinyl alcohol with an average molecular weight of 125,000 and 0.5% glutaraldehyde forms with softened water a gel in 3 hours at a temperature of 230° C. This composition is approximated by preparing a polymer mixture having a concentration of 10% polyvinyl alcohol with an average molecular weight of 125,000 and injecting the mixture at a rate of 24 CMPD in a stream of injected steam which can also contain a foaming agent which is injected at a rate equal to 100 CMPD of water. A 50% glutaraldehyde aqueous solution is injected at the wellhead at a rate of one CMPD. The polymer mixture and aqueous glutaraldehyde solution are simultaneously injected into the wellhead for a period of six hours, starting one day after beginning the third steam injection cycle. The total steam cycle is continued for 9 days and during that time the gel-forming composition and the gel produced therefrom are placed in-depth in the steam channels. After about 2.5 days into the third cycle the thusly formed gel causes steam to be diverted into parts of the oil-bearing structure that had not been swept with steam. Production rates one week after stopping steam injection show an increase in oil and a decrease in water production in the third cycle. Production data expected one week after stopping steam injection in each of the first three steam cycles is as follows:

| Cycle | Oil (CMPD) | Water (CMPD) |
| --- | --- | --- |
| First | 60 | 40 |
| Second | 30 | 80 |
| Third | 50 | 50 |

The various steam rates mentioned herein are to be understood to be expressed as their equivalent water rate whether expressed as a velocity or volumetric rate.

In alternative embodiments the second substance in above examples is admixed with the foaming agent and the second substance-foaming agent admixture is injected with steam into the formation as the gel-forming composition (without the second substance) is simultaneously injected. Separate conduits can be provided so that mixing of the two streams occurs (i.e. the first stream containing the first substance and acidic catalyst and the second stream containing the second substance, foam-forming composition and steam) at the wellbore proximate to the steam channels.

Unless otherwise specified herein, all percents are weight percents.

The gels, the methods of forming the gels, and the processes for preventing steam channeling have some degree of flexibility. It is permissible to use the formation brine of the subterranean zone as the water part of the gel-forming composition since the gel will form even with hard water. Other variations of formulations, methods and processes will be apparent from this invention to those skilled in the art.

The foregoing disclosure and description of the present invention is illustrative and explanatory thereof and various changes in gel formation procedures and gel composition may be made within the scope of the appending claims without departing from the spirit of the invention. For example, many gel formulations can be produced and variations in forming such gels in situ in steam channels will be apparent to one skilled in the art from this invention. For example, any number of sequential injection steps of the gel-forming compositions can be made. Furthermore, the necessary concentrations, amounts and sequence of injection of the gel-forming compositions can be tailored to suit the particular well or subterranean formation being treated.

What is claimed is:

1. In a hydrocarbon recovery operation conducted in a subterranean formation in which a loss of steam to nonproductive steam channels has occurred, a process for reducing steam loss to nonproductive steam channels comprising:
   (a) introducing an admixture of an effective amount of a gel-forming composition and an effective amount of a foam-forming composition and steam into said subterranean formation and into said nonproductive steam channels, said gel-forming composition being operable when gelled in said nonproductive steam channels with a foam formed from said foam-forming composition for retarding the flow of steam therein, said gel-forming composition comprising
      i. an aqueous solution comprising an effective amount of a first substance selected from the group consisting of polyvinyl alcohols, polyvinyl alcohol copolymers, and mixtures thereof, wherein said first substance is from about 0.5 to about 5% of the weight of said gel-forming composition,
      ii. an effective amount of a second substance selected from the group consisting of aldehydes, aldehyde generating substances, acetals, acetal generating substances, and mixtures thereof capable of crosslinking with the first substance through the formation of acetal crosslinkages, which is operable for effecting, under acidic conditions, crosslinking of said first substance and said aldehyde in said nonproductive steam channels, wherein said second substance is from about 0.01 to about 4% of the weight of said gel-forming composition;
   (b) allowing said foam-forming composition in said admixture to form a foam in said nonproductive channels;
   (c) allowing said gel-forming composition of said admixture, under acidic conditions, to form a gel in said thusly formed foam in said nonproductive steam channels within a predetermined period of time which is effective for retarding the flow of steam therein, thereby reducing steam loss to said nonproductive steam channels upon resumption of said hydrocarbon recovery operation; and
   (d) after said gel is formed in said nonproductive steam channels, injecting a substance into said formation to flush out gel-forming composition in said formation which has not gelled.

2. The process of claim 1, wherein said predetermined period of time is from about 1 hour to about 5 days after said gel-forming composition is formed.

3. The process of claim 1, wherein said gel is formed in the interstices of said foam in said nonproductive steam channels.

4. The process of claim 1, further comprising forming said gel in the interstices of said thusly formed foam in said nonproductive steam channels.

5. The process of claim 1, wherein said first substance is from about 1.5 to about 4% of the weight of said gel-forming composition.

6. The process of claim 1, wherein said gel formed in said nonproductive steam channels is at least about 91% by weight water.

7. In a hydrocarbon recovery operation conducted in a subterranean formation in which a substantial loss of steam to nonproductive steam channels has occurred, said subterranean formation also having an oil-bearing strata which has an average temperature which is substantially lower than the average temperature of said nonproductive steam channels, a process for reducing steam loss to nonproductive steam channels comprising:
   (a) introducing an admixture comprising an effective amount of a foam-forming composition admixed with an effective amount of a crosslinking substance and steam into said subterranean formation and into said nonproductive steam channels, said admixture having a predetermined elevated temperature which is about the same as said average temperature of said nonproductive steam channels, said crosslinking substance being selected from the group consisting of aldehydes, aldehyde generating substances, acetals, acetal generating substances, and mixtures thereof;
   (b) introducing an aqueous solution comprising an effective amount of a first substance selected from the group consisting of polyvinyl alcohols, polyvinyl alcohol copolymers, and mixtures thereof, into said subterranean formation and into said nonproductive steam channels;
   (c) contacting said aqueous solution comprising said first substance with said admixture thereby providing a gel-forming composition comprising said first substance and said crosslinking substance in said nonproductive steam channels,
      wherein said crosslinking substance is capable of crosslinking with the first substance through the formation of acetal crosslinkages,
      wherein said effective amount of said first substance and said effective amount of said crosslinking substance is operable under an acidic condition for effecting gelation of said gel-forming composition within a predetermined period of time when said gel-forming composition is maintained at said predetermined elevated temperature, and wherein said effective amount of said first substance and said effective amount of said crosslinking substance is inoperable under said acidic condition for effecting gelation of said gel-forming composition within said predetermined period of time when said gel-forming composition is maintained at a temperature equal to said average temperature of said oil-bearing strata, and wherein said predetermined period of time is from about 1 hour to about 5 days, and wherein said effective amount of said first substance is also from about 0.5 to about 5% of the weight of said gel-forming composition, and wherein said effective amount of said crosslinking substance is also from about 0.01 to about 4% of the weight of said gel-forming composition;
(d) allowing said foam-forming composition to form a foam in said nonproductive steam channels;
(e) allowing said gel-forming composition to form a gel in said nonproductive steam channels; and
(f) after said gel is formed in said nonproductive steam channels, injecting a substance into said subterranean formation to flush out gel-forming composition in said formation which has not gelled.

8. The process of claim 7 wherein said predetermined elevated temperature is at least about 125° C.

9. The process of claim 7, wherein said average temperature of said nonproductive steam channels is about 40° F. higher than said average temperature of said oil-bearing strata of said subterranean formation.

10. The process of claim 7, wherein said gel is formed in the interstices of said foam in said nonproductive steam channels.

11. The process of claim 7, wherein said first substance is from about 1 to about 4% of said gel-forming composition, wherein said crosslinking substance is from about 0.1 to about 2% of the weight of said gel-forming composition.

12. The process of claim 7, wherein said predetermined period of time is from about 2 hours to about 4 days, and wherein said predetermined elevated temperature is about 40° F. higher than said average temperature of said oil-bearing strata.

13. The process of claim 7, wherein said predetermined period of time is from about 3 hours to about 4 days, and wherein said predetermined elevated temperature is about 30° F. higher than said average temperature of said oil-bearing strata.

14. The process of claim 7, wherein said gel-forming composition is at least about 91% by weight water.

* * * * *